(12) United States Patent
Durgé

(10) Patent No.: US 11,891,150 B2
(45) Date of Patent: Feb. 6, 2024

(54) CONVERTIBLE TRICYCLE

(71) Applicant: TOADRUNNER INNOVATION AB, Älvsjö (SE)

(72) Inventor: Göran Durgé, Älvsjö (SE)

(73) Assignee: TOADRUNNER INNOVATION AB, Älvsjö (SE)

( * ) Notice: Subject to any disclaimer, the term of this patent is extended or adjusted under 35 U.S.C. 154(b) by 418 days.

(21) Appl. No.: 17/432,377

(22) PCT Filed: Feb. 17, 2020

(86) PCT No.: PCT/SE2020/050184
§ 371 (c)(1),
(2) Date: Aug. 19, 2021

(87) PCT Pub. No.: WO2020/171761
PCT Pub. Date: Aug. 27, 2020

(65) Prior Publication Data
US 2022/0250709 A1    Aug. 11, 2022

(30) Foreign Application Priority Data

Feb. 20, 2019 (SE) .................... 1950220-2

(51) Int. Cl.
*B62K 13/08*  (2006.01)
*B62B 3/02*   (2006.01)
(Continued)

(52) U.S. Cl.
CPC ............... *B62K 13/08* (2013.01); *B62B 3/02* (2013.01); *B62B 3/12* (2013.01); *B62J 7/06* (2013.01);
(Continued)

(58) Field of Classification Search
CPC . B62K 13/08; B62K 5/05; B62K 5/06; B62K 5/08; B62K 21/22; B62K 21/02;
(Continued)

(56) References Cited

U.S. PATENT DOCUMENTS 7,909,340 B2 *  3/2011  Henderson ............... B62K 5/08
                                                       280/771
2007/0057483 A1  3/2007  Barak et al.
(Continued)

FOREIGN PATENT DOCUMENTS

CN    201660062 U    12/2010
CN    203283327 U    11/2013
(Continued)

OTHER PUBLICATIONS

Search Report for International Application No. PCT/SE2020/050184 dated May 13, 2020.

*Primary Examiner* — Bryan A Evans
(74) *Attorney, Agent, or Firm* — Pearne & Gordon LLP

(57) ABSTRACT

A tricycle has a forward oriented fork member (20) supported for rotation about a steering axis (14) of the tricycle, a handle bar (50) mounted to the fork member, a cargo unit (24) supported by the fork member, and a pair of transversally spaced linkages (30), wherein each linkage at a proximal end is linked to the fork member and at a distal end supports a respective front wheel (16) of the tricycle. The cargo unit and the linkages are shiftable between respective forward and backward end positions to thereby transform the tricycle to a wheel cart and vice versa.

2 Claims, 4 Drawing Sheets

(51) Int. Cl.
    *B62B 3/12*       (2006.01)
    *B62J 7/06*       (2006.01)
    *B62K 5/05*       (2013.01)
    *B62K 5/06*       (2006.01)
    *B62K 5/08*       (2006.01)
    *B62K 21/02*     (2006.01)
    *B62K 21/22*     (2006.01)

(52) U.S. Cl.
    CPC ................... *B62K 5/05* (2013.01); *B62K 5/06* (2013.01); *B62K 5/08* (2013.01); *B62K 21/02* (2013.01); *B62K 21/22* (2013.01); *B62B 2206/006* (2013.01); *B62B 2206/02* (2013.01); *B62B 2301/10* (2013.01)

(58) Field of Classification Search
    CPC ....... B62B 3/02; B62B 3/12; B62B 2206/006; B62B 2206/02; B62B 2301/10; B62J 7/06
    See application file for complete search history.

(56) References Cited

U.S. PATENT DOCUMENTS

| | | | | |
|---|---|---|---|---|
| 2017/0021890 | A1* | 1/2017 | Barak | B62J 1/08 |
| 2017/0217528 | A1* | 8/2017 | Pham | B62K 13/04 |
| 2020/0094903 | A1* | 3/2020 | Weber | B62K 5/08 |

FOREIGN PATENT DOCUMENTS

| | | | |
|---|---|---|---|
| JP | 2005193740 | A | 7/2005 |
| KR | 20120098394 | A | 9/2012 |

\* cited by examiner

CONVERTIBLE TRICYCLE

FIELD OF THE INVENTION

This invention relates to a tricycle convertible to a wheel cart.

BACKGROUND OF THE INVENTION

When negotiating such tricycle in the wheel cart mode, for example around corners in crowded public areas, it is important that the cart is easy to navigate. To that end, it would be convenient if the wheelbase could be shortened compared to that in the tricycle mode. A prior art convertible tricycle meeting this demand is disclosed in KR 20120098394 A. For that purpose, this prior art tricycle has parts of a single main frame telescopically interconnected for being contracted or expanded to the selected mode. For convenient use, also a handle bar and a carrier/cargo unit may need to be shifted between modes. In said KR 20120098394 A these components are shifted linearly together with the main frame front part, whereby the handle bar can further be pivoted to opposite end positions, and the carrier, such as a child seat, can be rotated to face forward or backward.

DISCLOSURE OF THE INVENTION

An object of this invention is to provide a tricycle that is easily convertible in a novel manner.

In an aspect of the invention the tricycle comprises
a forward oriented fork member supported for rotation about a steering axis of the tricycle;
a handle bar mounted to the fork member;
a cargo unit supported by the fork member;
a pair of transversally spaced linkages, each linkage at a proximal end being linked to the fork member and at a distal end supporting a respective front wheel of the tricycle;
the cargo unit and the linkages being shiftable between respective forward and backward end positions to thereby transform the tricycle to the wheel cart and vice versa.

By having the front wheels in this manner shiftable between end positions through linkages, at least the wheel forward and backward modes may be easily obtained by a single shifting movement. Each wheel mode will also be self-supporting by the weight of the tricycle, i.e. with no need for further arresting of components in the selected mode.

While each linkage may comprise a single bar linkage, in one embodiment of the invention, each linkage comprises a parallelogram linkage, a bottom bar thereof supporting a respective front wheel, and front and rear bars thereof being linked to the fork member.

The linkages may further be mutually oriented in a forward diverging manner so as to change a wheel track of the front wheels when shifting the linkages. Thereby the tricycle will have a wide track for better stability in cycling mode and a narrow track for better negotiability in wheel cart mode.

In another embodiment, a lever pivotally connected to the fork member and engaged with the linkages, is capable, on operation, of shifting the linkages between said backward and forward end positions. Thereby the shifting of linkages can be easily performed.

The lever may comprise two transversally spaced arms, where a distal end of each arm is hinged to a respective lateral face of the cargo unit. Thereby the shifting of linkages and cargo unit can be synchronized to occur in unison.

The lever may further be engaged with the linkages by a gear transmission.

In still another embodiment, the cargo unit is supported slidably on the fork member between said forward and backward end positions.

Other features and advantages of the invention may be apparent from the detailed description and the annexed claims.

BRIEF DESCRIPTION OF THE DRAWING

In the drawing, components having mutually similar functions may be designated with same reference numerals.

DETAILED DESCRIPTION OF EMBODIMENTS

Figure 1:
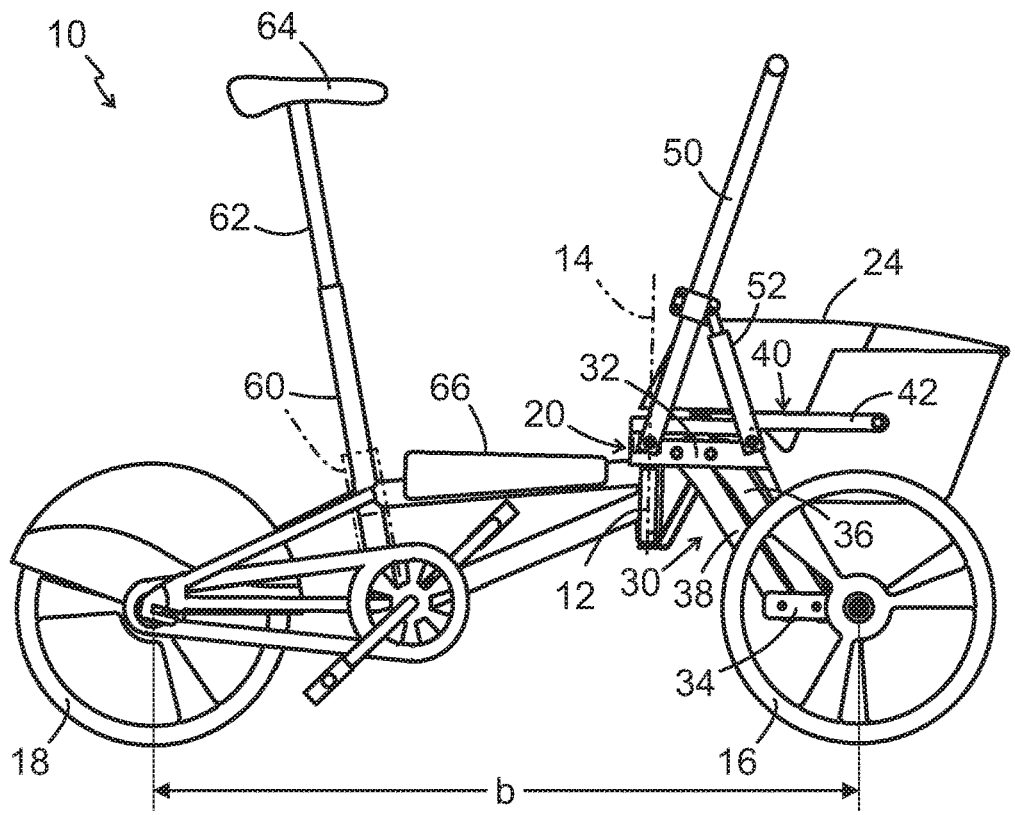
FIG. 1 is a side view of a tricycle according to the invention in a cycling mode.

The tricycle shown in the drawing is generally of the front cart type having a single rear wheel 18, two spaced apart parallel front wheels 16 and a cargo unit 24.

The front wheels 16 are supported for rotation about a steering axis 14 (FIG. 1) via a pair of linkages 30 and a forward oriented fork member 20. More precisely, in the exemplary embodiments shown, fork member 20 is journaled to a fork tube 12 of the tricycle frame and pivotally supports a proximal end of each linkage 30. The distal end of each linkage 30 rotationally supports a respective wheel of the front wheels 16.

In the embodiment of FIGS. 1-4, each linkage 30 is a parallelogram linkage.

Each parallelogram linkage 30 comprises a bottom bar 34 linked to bottom/distal ends of a front bar 36 and a rear bar 38. The top/proximal ends of front and rear bars 36, 38 are in turn linked to the fork member 20.

The linkages 30 are thereby capable of being shifted between a tricycle mode 10 (FIG. 1) and a wheel cart mode 10' (FIG. 2) and vice versa, where a wheelbase b is shifted accordingly.

Figure 3:
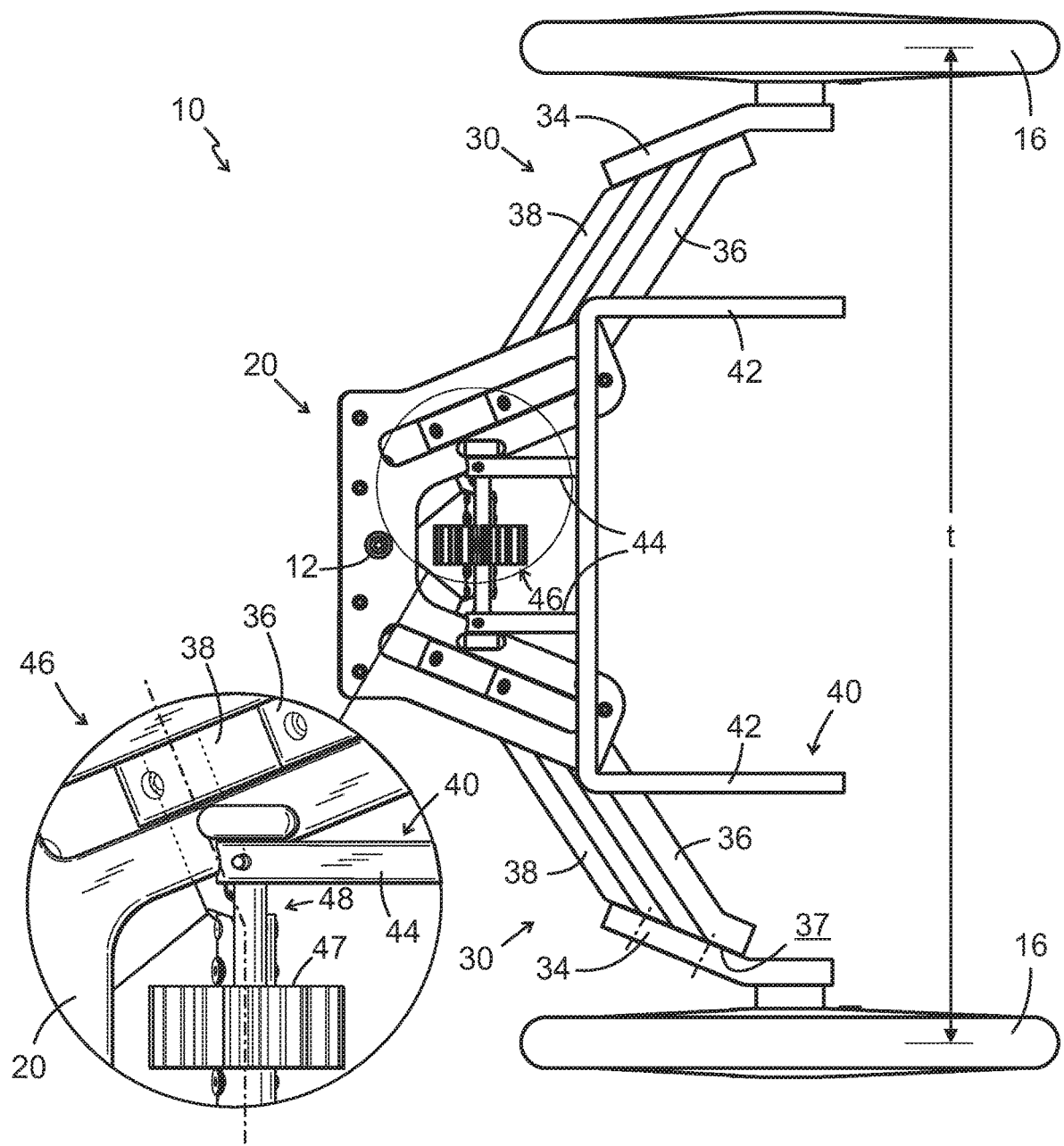
FIG. 3 is a top view of a front portion of the tricycle in the cycling mode.
Figure 4:
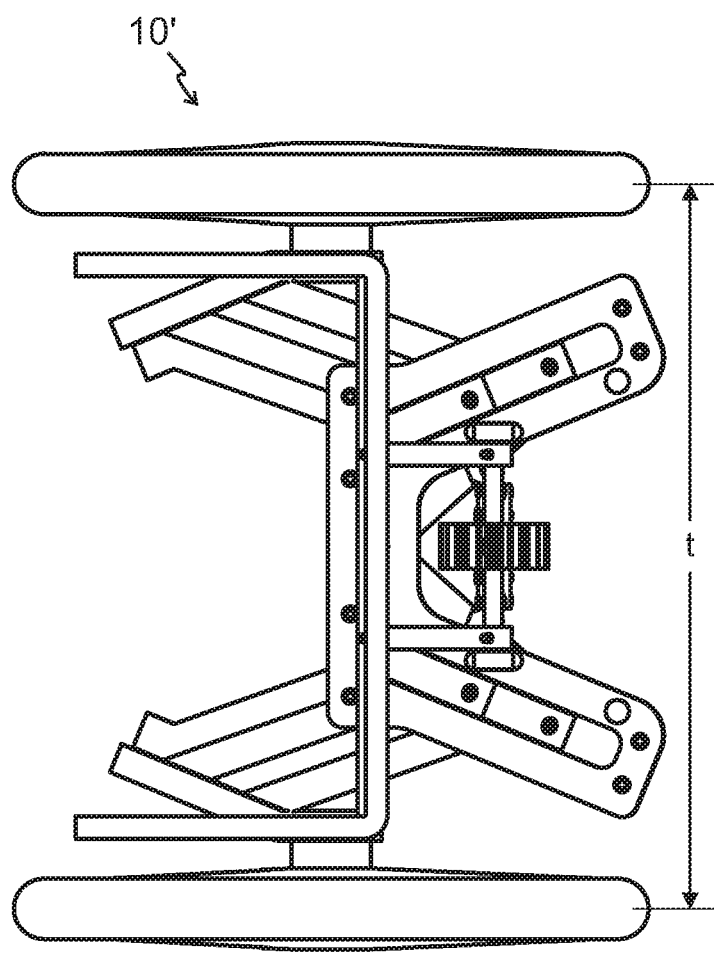
FIG. 4 is a top view of a front portion of the tricycle in the wheel cart mode.

As apparent from FIGS. 3 and 4, the linkages 30 may also be oriented in a forward diverging manner. Thereby also a wheel track t of the front wheels 16 will be shifted between modes 10 and 10', i.e. in the tricycle mode 10, track t is wide for providing stability when cycling, whereas in the wheel cart mode 10', track t, like base b, is narrow for better negotiability. As can be understood from FIG. 3, opposite end portions of the front and rear bars 36, 38 are angled to have vertically oriented connection faces, such as connection face 37 of bar 36.

Figure 2:
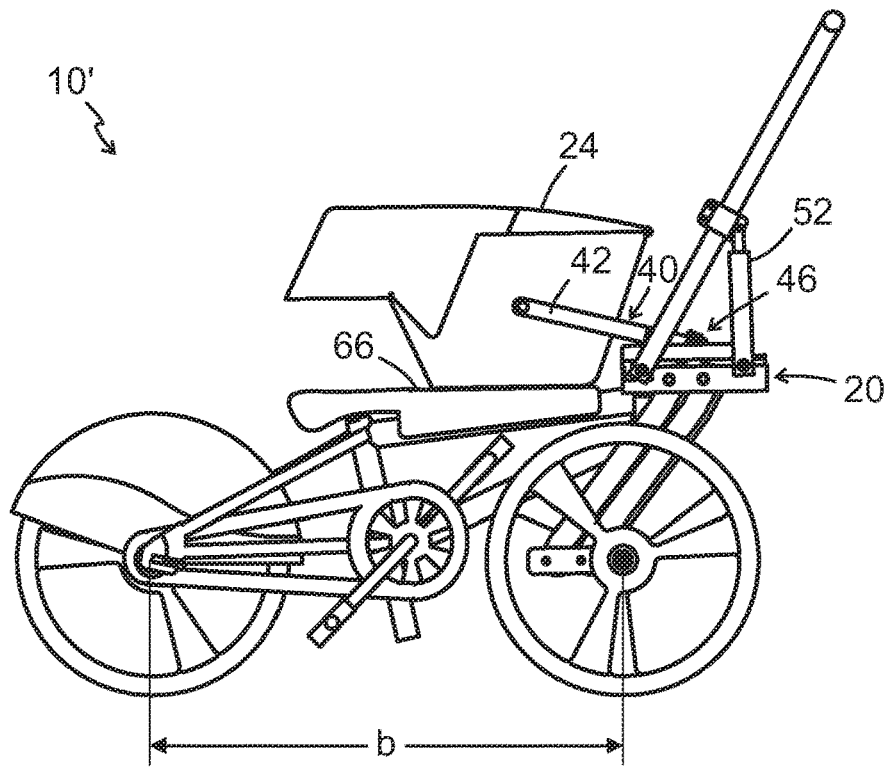
FIG. 2 is a side view of the tricycle of FIG. 1 in a wheel cart mode.

The cargo unit for the embodiment of FIGS. 1-4 is shown as a box 24 in FIGS. 1 and 2. Opposite lateral faces of box 24 are pivotally connected to distal ends of respective arms 42 of a lever 40. A proximal end of lever 40 is pivotally connected to the fork member 20 for engagement with the linkages 30 in a manner that the lever 40 is shifted from a forward end position to a backward end position in unison with the linkages 30. In the exemplary embodiment of FIGS. 1-4 this is achieved by means of a gear transmission 46. More precisely, as can be understood from the enlarged encircled area of FIG. 3, the transmission 46 has two mating vertically oriented gears, where an upper gear 47 is engaged by proximate arms 44 of the lever 40 and the lower gear (not shown) is engaged by the rear bars 38 of the linkages 30 via respective universal joints 48 (only one is shown).

The end positions of the linkages 30 and the cargo unit 24 can be defined by opposite faces of the front and rear bars 36, 38 comes into abutting engagement in each end position. In the rearward end position the cargo unit 24 may further rest on a supporting pad 66.

The tricycle handle bar 50 has a substantially inverted U-shape (shown in the FIGS. 5 and 6 embodiment only) for allowing passage therebetween of lever 40 and cargo unit 24 when shifting modes in the FIGS. 1-4 embodiment. Proximate ends of handle bar 50 are pivotally connected to the fork member 20. A pair of additional links 52 adjustable along the handle bar 50 may keep the handle bar 50 in a desired orientation.

To do away with the tricycle saddle 64 in the wheel cart mode, a seat tube 60 may be telescopic as diagrammatically illustrated in phantom in FIG. 1, so that saddle 64, seat tube 60, and a seat post 62 may be retracted approximately to the state shown in FIG. 2 in the wheel cart mode. It may alternatively be possible to divide the seat post by a hinge connection enabling an upper portion of seat tube to be pivoted away, for example backward, together with saddle and seat post (not shown).

Figure 5:
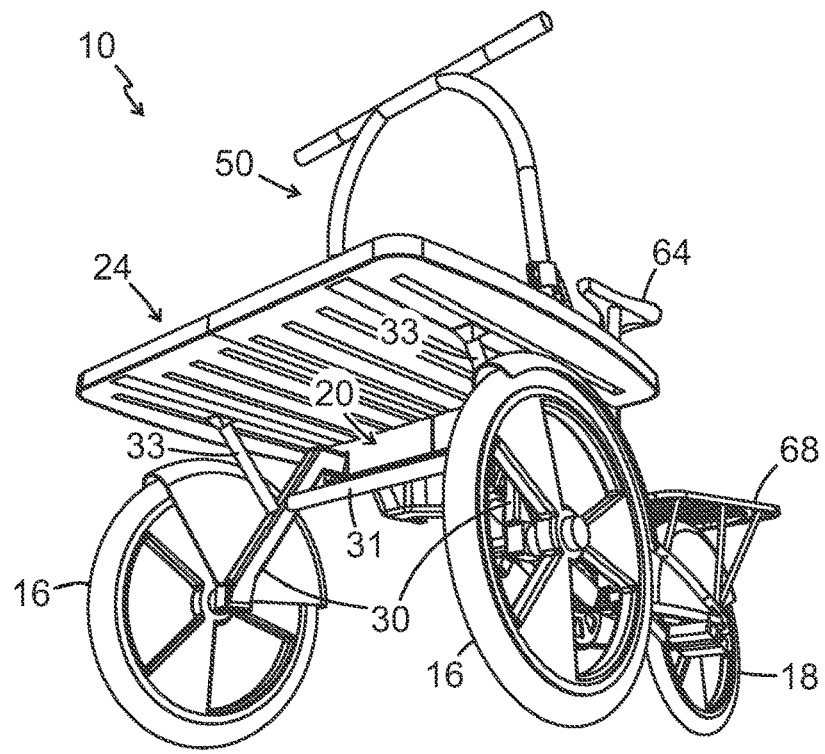
FIG. 5 is a perspective view from below of another embodiment of a tricycle according to the invention in a cycling mode.
Figure 6:
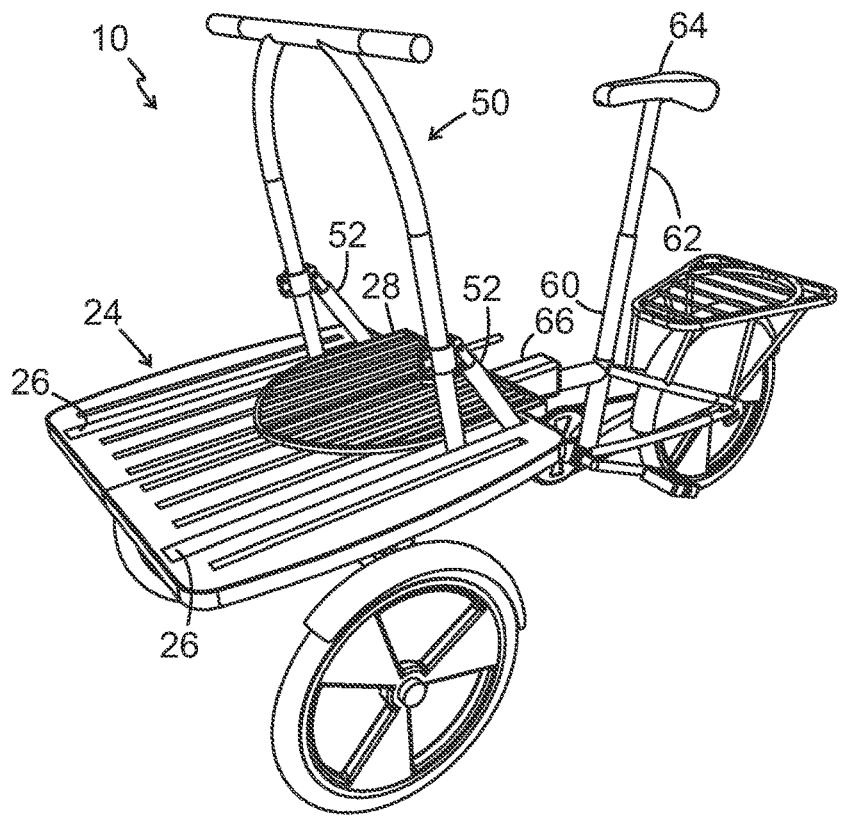
FIG. 6 is a perspective view from above of the tricycle shown in FIG. 5.

In the embodiment of FIGS. 5 and 6, each linkage 30 is a single, angled bar linkage.

In this embodiment the linkages 30 are interconnected by a stabilizing crossbar 31. The forward end position of the linkages 30 is defined by a top face of a proximal end portion of each angled bar 30 abutting a bottom face (not shown) of the fork member 20. The backward end position of linkages 30 is in turn defined for example by a bottom face of said proximal end portion of each angled bar 30 abutting a forward face (not shown) of the fork member 20.

The cargo unit 24 in the FIGS. 5 and 6 embodiment is a slidable rectangular board supported on the fork member 20 and having a pair of slots 26 receiving proximal end portions of the handle bar 52 and the additional links 52. The cargo unit 24 is thereby supported slidably between the forward and backward end positions. In the forward end position, cargo unit 24 may be further supported by projections 33 extending from the bars 30, and in the backward end position, cargo unit 24 may be supported by the pad 66 and/or the retracted (not shown in FIGS. 5 and 6) saddle 64. The cargo unit 24 may also have a foldable piece of board 28 intended to increase the load area by being folded backward to a position resting on a rear luggage carrier 68 in the wheel cart mode of the tricycle.

The foregoing detailed description is given primarily for clearness of understanding and no unnecessary limitations are to be understood therefrom. Modifications will become obvious to those skilled in the art upon reading this disclosure and may be made without departing from the spirit of the invention or the scope of the appended claims.

The invention claimed is:

1. A tricycle convertible to a wheel cart comprising:
   a forward oriented fork member (20) supported for rotation about a steering axis (14) of the tricycle;
   a handle bar (50) mounted to the fork member (20);
   a cargo unit (24) supported by the fork member (20);
   a pair of transversally spaced linkages (30), each linkage at a proximal end being linked to the fork member (20) and at a distal end supporting a respective front wheel (16) of the tricycle; wherein:
   the cargo unit (24) and the linkages (30) are shiftable between respective forward and backward end positions to thereby transform the tricycle (10) to the wheel cart (10') and vice versa;
   each linkage comprises a parallelogram linkage, a bottom bar (34) thereof supporting a respective front wheel (16), and front and rear bars (36, 38) thereof being linked to the fork member (20); and
   the linkages (30) are mutually oriented in a forward diverging manner so as to change a wheel track (t) of the front wheels (16) when shifting the linkages.

2. The tricycle of claim 1, wherein the cargo unit (24) is supported slidably on the fork member (20) between said forward and backward end positions.

* * * * *